No. 642,861. Patented Feb. 6, 1900.
A. WOLLENSAK.
PHOTOGRAPHIC SHUTTER.
(Application filed Aug. 14, 1899.)
(Model.) 2 Sheets—Sheet 1.

Attest:
M. L. Winston.
E. B. Rhoads.

Inventor:
A. Wollensak,
By E. B. Whitmore,
Atty.

No. 642,861. Patented Feb. 6, 1900.
A. WOLLENSAK.
PHOTOGRAPHIC SHUTTER.
(Application filed Aug. 14, 1899.)

(Model.) 2 Sheets—Sheet 2.

Attest
C. B. Rhoads.
M. D. Phillips.

Inventor.
A. Wollensak,
By E. B. Whitmore,
Atty.

UNITED STATES PATENT OFFICE.

ANDREW WOLLENSAK, OF ROCHESTER, NEW YORK.

PHOTOGRAPHIC SHUTTER.

SPECIFICATION forming part of Letters Patent No. 642,861, dated February 6, 1900.

Application filed August 14, 1899. Serial No. 727,179. (Model.)

*To all whom it may concern:*

Be it known that I, ANDREW WOLLENSAK, a citizen of the United States, residing at Rochester, in the county of Monroe and State of New York, have invented a new and useful Improvement in Photographic Shutters, which improvement is fully set forth in the following specification and shown in the accompanying drawings.

My invention is a photographic shutter having parts constructed and arranged so that a time exposure, a bulb exposure, or an instantaneous exposure may be made of an object to be photographed conveniently and with little loss of time in arranging the shutter for any of said exposures.

The invention is hereinafter fully described in connection with the accompanying drawings and more particularly pointed out in the claims.

Figure 1:
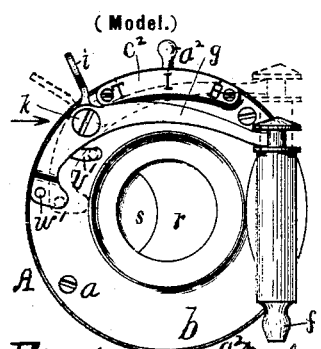
Figure 2:
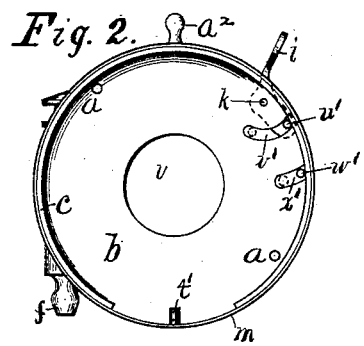
Figure 3:
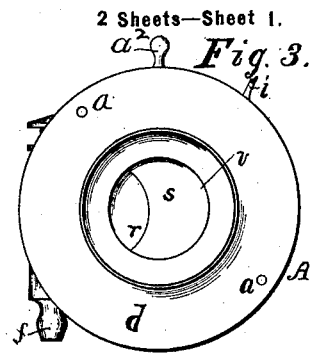
Figure 4:
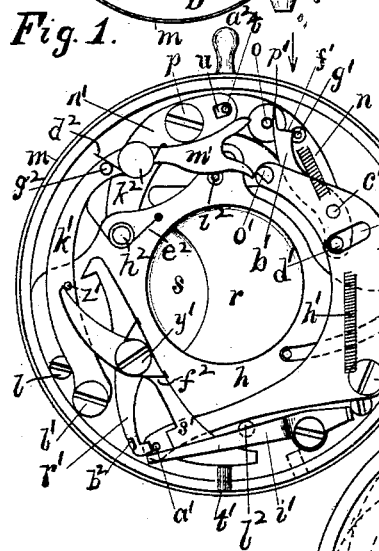
Figure 5:
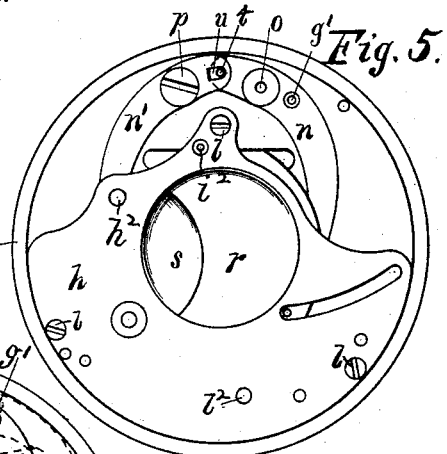
Figure 6:
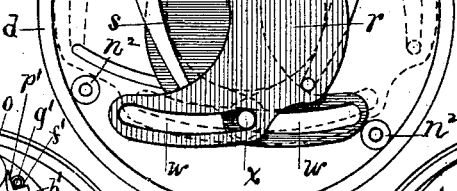
Figure 11:
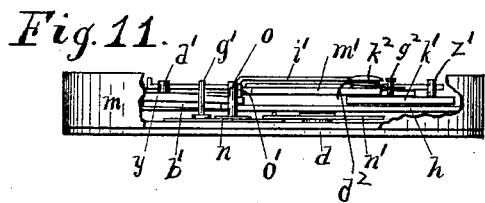
Figure 12:
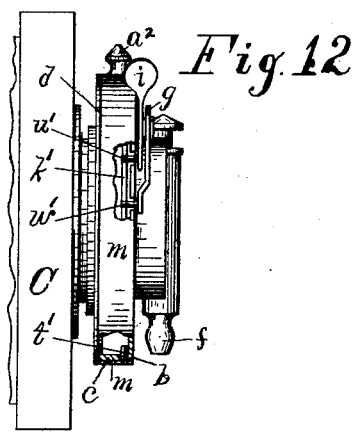
Figure 13:
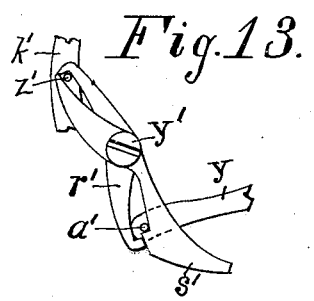

Referring to the drawings, Figure 1 is a front view of the device, parts being shown in two positions by full and dotted lines. Fig. 2 is a view of the inside of the cap or cover. Fig. 3 is a rear view of the device. Fig. 4 shows the internal working parts, the cover being omitted. Fig. 5 is a view similar to Fig. 4 with many of the working parts omitted. Fig. 6 is a view similar to Fig. 5 with the diaphragm and dependent parts omitted, parts being shown in various positions by full and dotted lines. Figs. 7, 8, 9, and 10 show the internal working parts in different positions. Fig. 11 is an edge view of parts of the device seen as indicated by arrow in Fig. 4, a part of the setting-ring being broken away. Fig. 12 is a side elevation of the device seen as indicated by arrow in Fig. 1, showing its connection with the camera, parts being broken away. Fig. 13 shows a manner of stopping the return of the master-lever. Figs. 4 to 11, inclusive, and Fig. 13 are drawn to a scale once and a half that of the remaining figures.

A is a metal inclosing case consisting of a main circular plate $d$ and a flanged cover or part $b$, held together by fasteners $a\ a$, Figs. 1 and 2, the free edge of the flange $c$ of the part $b$ resting against the plate, as shown in Fig. 12. The cover $b$ is provided on its outer front face with an ordinary air-cylinder $f$, having a piston, Figs. 1 and 12, for using a bulb, and a lever $g$, connected with the cylinder for operating the parts within. The part $b$ is also provided with a thumb-lever $i$ for operating the interior parts by a pressure of the finger of the operator, both levers being fulcrumed at $k$. A sheet-metal diaphragm $h$, Figs. 5 and 11, is secured to the plate $d$ by means of fastening-screws $l$, it being parallel with the plate and held apart therefrom by spacing-bosses $n^2$, Fig. 6, to which diaphragm many of the movable parts within the case A are secured.

$n\ n'$, Figs. 5, 6, and 11, are a pair of similar arms secured by pivots $o\ p$, respectively, to the plate $d$, which carry at their free ends thin closing blades $r\ s$, preferably of hard rubber, adapted to move directly back of the diaphragm $h$ to control the opening $v$ through the shutter. These arms or blade-carriers are joined by means of a pin $t$, rigid with the carrier $n$, occupying a slot $u$ in the carrier $n'$, so that both must move simultaneously, though in opposite directions, to open or close, as the case may be, the opening $v$. The closing blades are similar and formed with concave edges facing each other, the concavities being circular and of a radius equal with that of the opening $v$, and further formed with curved slots $w\ w$ for traversing a common guide-pin $x$ to aid in controlling their motions.

Figure 7:
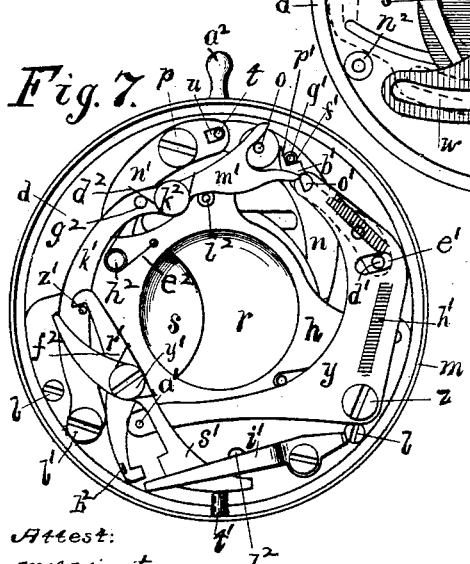
Figure 8:
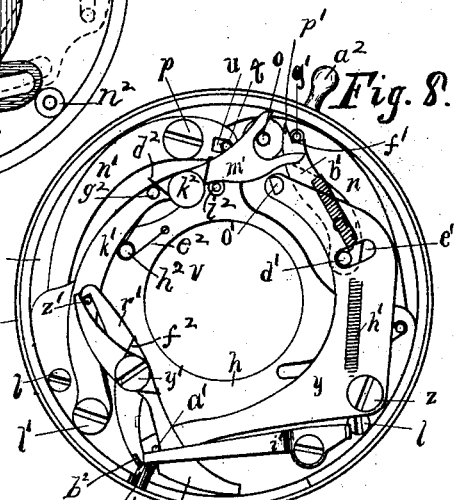
Figure 9:
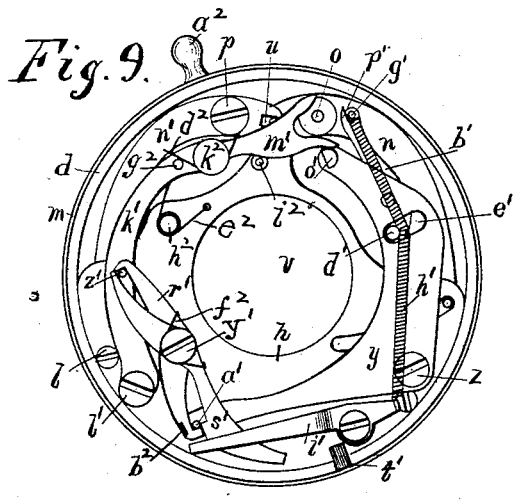
Figure 10:
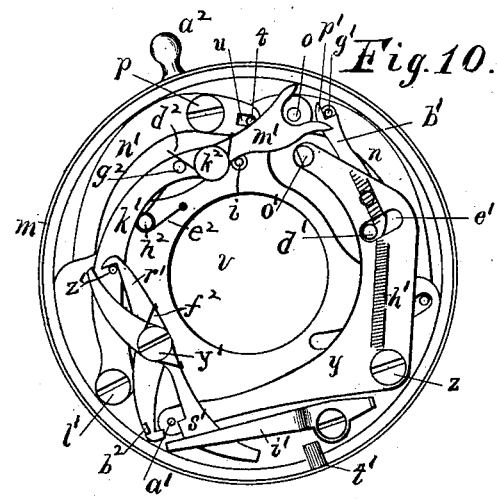

Upon the front face of the diaphragm is mounted a master-lever $y$, Figs. 4 and 11, pivoted at $z$, having a rigid pin $a'$ at its lower extreme end. This lever is further provided with a trip-lever $b'$, pivoted at $c'$, having a pin $d'$ held to extend forward through and play in a slot $e'$ of the master-lever. The trip-lever is formed at its outer free end with a transverse shoulder $f'$, which in some positions of the parts engages a stud $g'$, rigid in the blade-carrier $n$. (See Figs. 7 to 10.) A coil actuating-spring $h'$, (in part broken away for the sake of clearness in Figs. 4, 7, 8, and 10, but shown in full in Fig. 9,) joined at one end to the stud $g'$ and at the other to a tension-lever $i'$, is bent laterally around the pin $d'$ of the trip-lever $b'$. By means of this spring and associated parts the blade-carriers $n$ and $n'$ are moved to open or close the shutters, as may be necessary, this spring serving to actuate all the moving parts within the inclosing case A. The master-lever $y$ is further actuated by means of an operating-lever $k'$, Fig. 4, pivoted to the diaphragm at $l'$ and held normally to the left by a slender spring $e^2$ upon a stud $h^2$, rigid in the diaphragm. At its free end this lever is provided with a fork $m'$, held by a controlling-spring $d^2$ upon the pivot-pin $k^2$ normally against a guide pin or stud $i^2$, adapted to have its lower branch bear against a stud $o'$ of the lever $y$, so that as the lever $k'$ is pushed toward the right the lever $y$ will be carried toward the right, as appears in Fig. 7, effecting this movement against the action of the spring $h'$. This action of the lever $y$ causes the trip-lever $b'$ to shift from its normal position of idleness shown in Fig. 4 to the position shown in Fig. 7, in which the stud $g'$ is engaged by it preparatory to operating the carriers $n\ n'$ and making an exposure by opening the blades $r\ s$. The pivot $o$ of the carrier $n$ extends forward, as appears in Fig. 11, so as to engage the upper branch of the fork $m'$ when the latter is pushed against the stud $o'$, which on account of the curved form of the branch serves to draw the lower branch off of the stud $o'$ and suddenly release the lever $y$, thus giving all the parts over to the control of the actuating-spring $h'$. The positions of the working parts the instant before the fork releases the lever $y$ are shown in Fig. 7 and in Fig. 4 the instant after the release of said lever, all parts being instantly returned to their normal positions (shown in said latter figure) by the spring after the fork clears the stud $o'$; but during the minute interval of time occupied by the returning of the parts the blades $r\ s$ are opened and again closed, effecting an instantaneous exposure of the object to be taken. Normally the spring holds the pin $d'$ against the lever $y$ at the left end of the slot $e'$, as shown in Figs. 4 and 8, which causes said lever and the trip-lever $b'$ to tend to act as a single piece or lever. On account of this when the lever $y$ is pushed to the right by the fork, as stated, the trip-lever early assumes the position relative with the stud $g'$, (shown in Fig. 7;) but its outer end is prevented from moving farther toward the right on account of the finger $p'$ encountering the stud. As a result the continued movement of the lever $y$ toward the right causes the trip-lever to turn upon its pivot $c'$ and carry the pin $d'$ toward the right in the slot $e'$, farther bending the spring $h'$ away from a straight line. All this occurs just before the fork releases the stud $o'$, and the parts are now in position to open the blades when said stud is released. When the fork clears the stud, the first act of the spring is to return the pin $d'$ to its normal position at the left end of the slot, which lengthens the duplex lever acting upon the stud $g'$—that is to say, increases the distance between said stud and the pivot-pin $z$, which serves to momentarily push the carriers $n\ n'$ back, as shown in dotted positions in Fig. 6, and open the blades. Also the continued action of the spring against the pin $d'$ in an attempt to assume a straight line between its end bearings serves to quickly return all the parts to their normal positions, (shown in Fig. 4,) in which the blades are closed.

The parts of the shutter are operated by the artist by pressing the operating-lever $k'$ toward the right by means of the thumb-lever $i$, Figs. 1 and 2, or the pump-lever $g$, using in the latter case a bulb connected with the pump. The thumb-lever has a pin $u'$, Figs. 2 and 12, extending inward through a slot $v'$ in the cover A in position to press the lever $k'$ when the thumb-lever is turned. Also the pump-lever $g$ is provided with a similar pin $w'$ entering a slot $x'$ to similarly act upon the lever $k'$ to operate the inner parts.

The description so far has been with reference to the actions of the parts when making instantaneous exposures. For bulb and time exposures other parts are brought into action. A setting-ring $m$, Figs. 2, 4, and 12, is placed to turn on the outside of the flange $c$ of the cover $b$, it being provided with an inwardly-projecting pin $t'$. Stop-levers $r'\ s'$, crossing each other and pivoted at $y'$ to the diaphragm, are adapted to engage the pin $a'$ of the master-lever $y$ and be controlled at their upper ends by a pin $z'$, rigid in the operating-lever $k'$. These copivotal stops are held normally closed or together, as shown in Fig. 8, by means of a simple spring $f^2$, bent around the pivot $y'$, bearing against their respective edges, there being openings between them on opposite sides of the pivot in which to receive the respective pins or studs $a'\ z'$. The pin $z'$ acts in opposite directions against the levers, tending to open or spread them against the action of the spring $f^2$. For instantaneous work the setting-ring is turned by means of the knob or handle $a^2$ to bring the pin $t'$ under the stop-lever $s'$ and hold it out of action, as shown in Figs. 4 and 7. For bulb exposures the ring is turned to the position shown in Fig. 8, in which the pin $t'$, engaging a projection $b^2$ of the stop-lever $r'$, holds the latter out of action, but permits the lever $s'$ to catch the pin $a'$, as shown in Fig. 8 or better in Fig. 13, when the master-lever is returning to normalcy. This arresting of the return motion of the master-lever holds the blades open and continues the exposure, as the closing of the opening $v$ by the blades is effected only while the lever is just completing its return motion or while the end carrying the pin $a'$ is moving from the position shown in Fig. 8 to that shown in Fig. 4. When the bulb is released, serving to free the lever $k'$, the latter in returning to the left by the action of the spring $h'$ carries the upper end of the lever $s'$ with it and so releases the pin $a'$ and allows the master-lever and connected parts to complete their return and terminate the exposure. The pin $t'$ in this position also raises the free end of the spring-lever $i'$ and tightens the spring $h'$, causing it to act more quickly to close the blades. For time exposures the setting-ring is turned to the position shown in Figs. 9 and 10, in which the pin $t'$ is idle. In this case the pin $a'$ is caught by the stop-lever $r'$, holding the blades open until the pin is released, which is effected by a second pressure of the thumb-lever by the attendant. Pressing the thumb-lever the first time serves to throw the parts to the positions shown in Fig. 9, in which the exposure is made. When it is wished to terminate the exposure, the thumb-lever is again pressed, which forces the lever $k'$ a second time toward the right and by means of the pin $z'$ turns the lever $r'$ to the position shown in Fig. 10, which releases the pin $a'$, allowing all the parts to return to normalcy. (Shown in Fig. 4.) It will be observed by inspecting Fig. 9 that the inturned edges or shoulders of the stop-levers, which serve to catch the pin $a'$, are not even or in line with each other, the ledge of the lever $s'$ being the higher or so as to be about opposite the middle of the pin $a'$ when held by the lever $r'$. This is to prevent the lever $s'$ from catching the pin when released by the lever $r'$, so the pin must of a certainty pass down between the separated levers, as appears in Fig. 4.

As a matter of convenience for setting the ring $m$ a plate $c^2$, Fig. 1, is secured to the front side of the cap $b$, marked with the initials "T" "I" "B," ("Time," "Instantaneous," "Bulb,") to which to turn the knob $a^2$, as occasion requires. If the work in hand is such that, for example, numerous instantaneous exposures are required in succession, the knob is brought opposite "I," after which the shutter is ready for the work without further setting—that is to say, the device does not need to be set for each exposure. This is likewise true of the other kinds of exposures. The ring being once set for either, the shutter is always ready for any number of such exposures and does not need to be reset unless a different kind of exposure is required. This I regard as an important feature of the invention.

What I claim as my invention is—

1. A photographic shutter adapted to make time, instantaneous and bulb exposures, having an annular setter adapted to occupy any one of three positions for controlling the mechanism to effect any of such exposures, with means for operating the exposure mechanism, substantially as shown and described.

2. A photographic shutter arranged to make exposures of different kinds as to duration, having an annular setter adapted to occupy different positions one for each of the different kinds of exposures, for controlling the exposure mechanism, with means for operating the mechanism, substantially as set forth.

3. A photographic shutter, having two oppositely-acting slotted closing blades formed with concave opposing edges, coacting carriers for the blades, and a common guide-pin for the blades, with means for operating the blade-carriers, substantially as specified.

4. A photographic shutter, having a pair of equal oppositely-acting closing blades, pivoted carriers for said blades, a master-lever with coacting mechanism for actuating the closing blades, a pivoted stop for controlling the master-lever, and means for controlling said stop, substantially as shown and described.

5. A photographic shutter having a pair of similar coacting closing blades, carriers for the blades, a master-lever, a trip-lever carried by the master-lever to operate the blade-carriers, an actuating-spring for the master-lever, and means for moving the master-lever against the action of the spring, substantially as described.

6. A photographic shutter having two similar closing blades, carriers for the blades, a master-lever, a trip-lever attached to the master-lever, having independent motion thereon, an actuating-spring for the trip-lever and the master-lever, and means for giving the master-lever positive motion against the spring, substantially as set forth.

7. A photographic shutter having closing blades, carriers for said blades, a master-lever with coacting mechanism to actuate said blades, a pair of oppositely-acting stops to control the master-lever, and means for actuating and controlling said stops, substantially as and for the purpose specified.

8. A photographic shutter having coacting closing blades, carriers for the blades, a two-part lever to actuate said carriers, an actuating-spring, a lever for controlling the spring, and means for controlling the lever, and for operating the parts, substantially as shown and for the purpose set forth.

9. In a photographic shutter constructed to make time, instantaneous and bulb exposures, an annular setter for controlling the exposure mechanism, and means acting in conjunction with said setter to hold such shutter and mechanism when set for either exposure, as set forth.

10. A photographic shutter comprising an inclosure, a diaphragm in said inclosure, a pair of oppositely-acting slotted closing blades and carriers therefor on one side of the diaphragm, a common guide-pin working in the slots of the shutters and actuating mechanism for said blades on the other side of the diaphragm, substantially as shown.

11. A photographic shutter having an operating-lever, a fork pivotally mounted on said lever and having a curved branch, and a controlling master-lever adapted to be moved by said fork, substantially as set forth.

12. A photographic shutter having a curved operating-lever, a fork held by said lever, a controlling or master lever adapted to be moved by said fork, a stud projecting laterally from the end of the master-lever to be engaged by said fork and a fixed stud for engaging the fork, substantially as and for the purpose set forth.

13. The operating-lever of a photographic shutter, having a fork pivoted at its end, a master-lever having a laterally-projecting stud engaged and operated by one branch of said fork, and a fixed stud for engaging the other branch of the fork, there being a spring for controlling the fork, substantially as specified.

14. The operating-lever of a photographic shutter, carrying a pivotal fork, a master-lever having a part to receive the lower branch of the fork, and a fixed stud for engaging the upper branch of the fork, said upper branch being curved whereby as it slides over said stud the lower branch will be drawn away from the master-lever, substantially as specified.

15. A photographic shutter having a curved operating-lever, and a curved fork movable thereon, a master-lever curved oppositely to the operating-lever and adapted to be encountered by the fork, a controlling-spring for the fork, and a rigid stud to guide the fork, substantially as described.

16. In a photographic shutter, an operating-lever, and a pair of coacting levers adapted to be actuated by said operating-lever, and a master-lever controlled by said pair of coacting levers, substantially as described.

17. A photographic shutter having an operating-lever provided with a stud, and a pair of coacting cross-levers adapted to be encountered by said stud, and a master-lever controlled by said cross-levers, said stud being between the cross-levers and adapted to move them in opposite directions, substantially as described and shown.

18. A photographic shutter having an operating-lever, a pair of coacting cross-levers adapted to be moved in opposite directions by the operating-lever, and a master-lever controlled by said cross-levers, and means for holding said cross-levers closed upon each other or together, substantially as shown and described.

19. A photographic shutter having an operating-lever, and a pair of copivotal cross-levers coacting with said operating-lever, and a master-lever controlled by said cross-levers, there being a spring upon the common pivot of said cross-levers bearing at its ends against said respective cross-levers, substantially as described.

20. In a photographic shutter, an operating-lever, and a pair of copivotal cross-levers actuated by said operating-lever, and formed with ledges, and a master-lever having a pin adapted to be engaged by one or the other of said ledges, substantially as set forth.

21. In a photographic shutter, an operating-lever, and a pair of copivotal cross-levers actuated by said operating-lever, and formed with ledges, and a master-lever having a pin adapted to be engaged by either of said ledges, the latter being at different distances from the common axis of the cross-levers, substantially as and for the purpose specified.

22. A photographic shutter having an operating-lever, and a pair of coacting cross-levers actuated by said operating-lever, said cross-levers being formed at one end of each with inwardly-projecting parts adapted to meet, and a master-lever having a pin adapted to be engaged by either of said cross-levers and to pass between said inwardly-projecting parts, substantially as and for the purpose specified.

23. A photographic shutter having a master controlling-lever provided with a stud, in combination with a pair of coacting cross-levers formed with inwardly-projecting parts adapted to meet, said cross-levers each adapted to engage the stud of the master-lever, and means for causing said cross-levers to release said stud, substantially as described.

24. A photographic shutter having an operating-lever, and a pair of cross-levers actuated by said operating-lever, and a movable setter adapted to engage one of said cross-levers to hold it out of action, substantially as and for the purpose shown.

25. A photographic shutter having an operating-lever, and a master-lever, each provided with a stud, and a pair of cross-levers between said operating-lever and the master-lever, the cross-levers coacting at their opposite ends with said respective studs, substantially as and for the purpose specified.

26. A photographic shutter having an operating-lever, and a master-lever, each provided with a stud, and a pair of coaxial cross-levers between said operating-lever and the master-lever, the cross-levers forming openings between them on opposite sides of their common axis to receive said respective studs, substantially as shown.

27. A photographic shutter having a master controlling-lever, a spring to actuate said master-lever, a tension-lever to strain said spring, and a pair of cross-levers coacting with said master-lever, one of said cross-levers having a rest or projection to engage said tension-lever, and means to turn the latter on its axis against the action of the spring, substantially as set forth.

28. In a photographic shutter, a master-lever formed with a transverse slot, a trip-lever held movably upon said master-lever and having a pin extending through said slot, and an actuating-spring to engage said pin, with means for limiting the actions of said master-lever and the trip-lever, substantially as shown.

29. In a photographic shutter, coacting closing blades and carriers therefor, one carrier being provided with a pair of studs, a master-lever, and a trip-lever held movably by said master-lever, said trip-lever being adapted to be engaged alternately by said studs, and means to operate the parts, substantially as described.

30. A photographic shutter constructed to make time, instantaneous and bulb exposures, an annular setter adapted to occupy different positions, one for each of the different kinds of exposure, exposure mechanism and connections whereby the said exposure mechanism is caused to occupy the same position both after and before an exposure, substantially as specified.

31. A photographic shutter constructed to make time, instantaneous and bulb exposures and comprising a casing, exposure mechanism therein, an annular setter adapted to occupy different positions one for each kind of exposure, and a single lever or part projecting from the casing to actuate the exposure mechanism, as set forth.

32. In a photographic shutter constructed to make time, instantaneous and bulb exposures and having its exposure mechanism constructed so that in moving to terminate an exposure it will simultaneously and automatically move into a position for another exposure without subsequent changing of the parts, and an annular setter adapted to occupy different positions, one for each kind of exposure, substantially as described.

In witness whereof I have hereunto set my hand, this 12th day of August, 1899, in the presence of two subscribing witnesses.

ANDREW WOLLENSAK.

Witnesses:
 ENOS B. WHITMORE,
 STEPHEN RUNLIN.